(12) United States Patent
Wu

(10) Patent No.: US 6,455,775 B1
(45) Date of Patent: Sep. 24, 2002

(54) LIGHT FIXTURE ASSEMBLY AND INSTALLATION STRUCTURE CAPABLE OF BOTH HANGING AND SUSPENDED APPLICATIONS

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 09/838,109

(22) Filed: Apr. 20, 2001

(51) Int. Cl.[7] .............................................. H01R 13/46
(52) U.S. Cl. ............................ 174/54; 174/48; 174/50; D23/377; D23/379; D23/411; 220/3.2
(58) Field of Search ............................. 174/50, 54, 48; D23/411, 377, 379; 220/3.2; 361/600

(56) References Cited

U.S. PATENT DOCUMENTS

| | | | | |
|---|---|---|---|---|
| 5,336,103 A | * | 8/1994 | Herboldsheimer | 439/265 |
| 5,454,729 A | * | 10/1995 | Wen-Te | 439/357 |
| 5,883,332 A | * | 3/1999 | Collard | 174/57 |

\* cited by examiner

Primary Examiner—Dean A. Reichard
Assistant Examiner—Anton Harris
(74) Attorney, Agent, or Firm—Troxell Law Office PLLC

(57) ABSTRACT

A light fixture assembly and installation structure capable of both hanging and suspended applications in which a desk lamp suspending rod is tightly fastened to the circumferential edge of a switch box, wherein a mounting block has extending from its lateral end a rectangular passage and the suspending rod has at its bottom end a rectangular insertion rod for fastening that matches the shape of the passage, thereby providing for the insertion and tight positioning of the suspending rod in the passage. The mounting block has situated at the inside of the switch box a platform, with a retainer hinged to each of its two sides and, furthermore, the free ends of the retainers normally project into the passage. Installed to the top surfaces of the retainers is a positioning spring fastened by means of a bolt and, furthermore, the positioning spring is normally in a compressed state. As such, since the suspending rod is inserted and tightly positioned in the passage of the switch box without fastening additional bolts and using the associated tools, the invention herein effectively achieves assembly and installation simplicity and convenience.

3 Claims, 6 Drawing Sheets

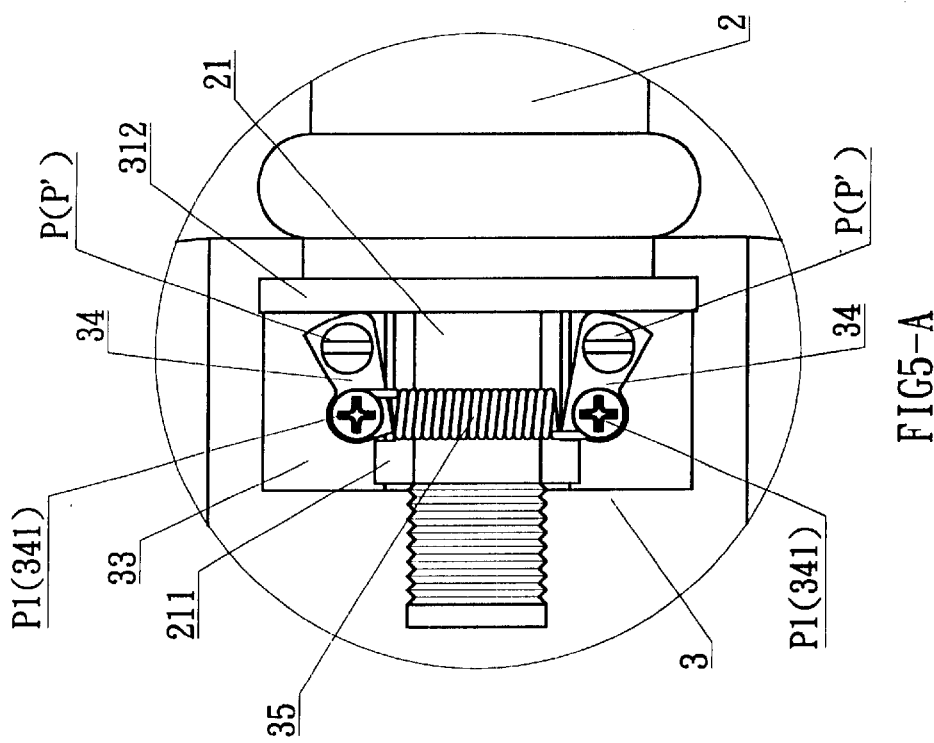
FIG5-A
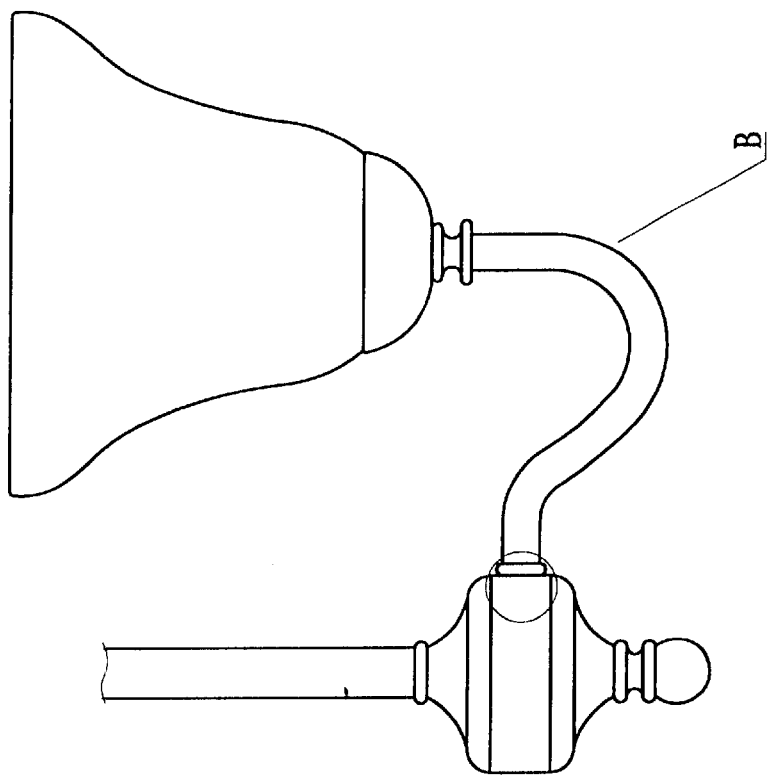
FIG5

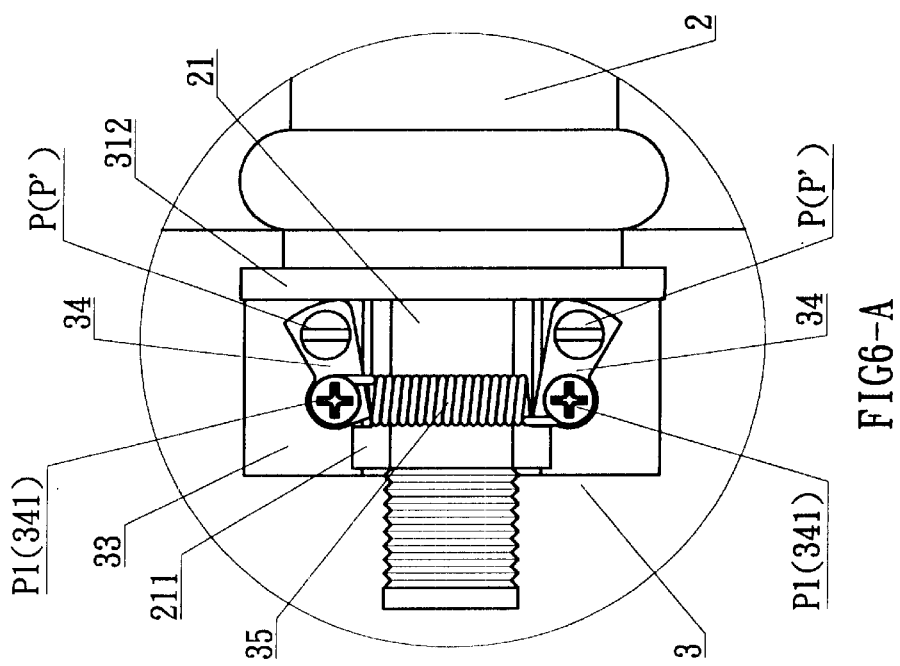
FIG6-A
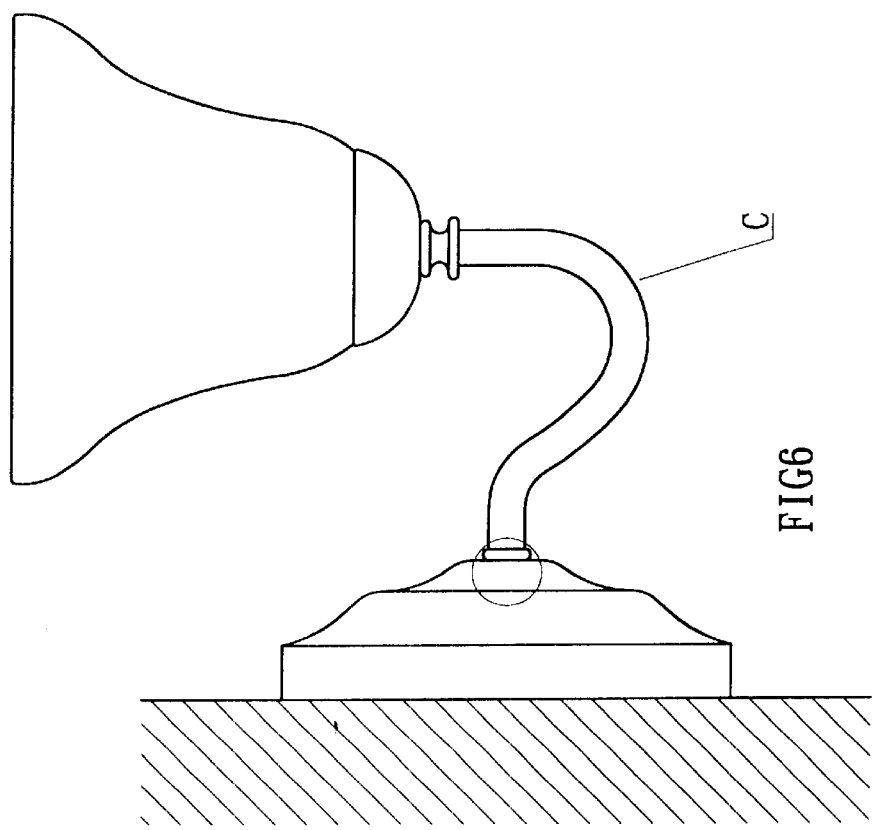
FIG6

LIGHT FIXTURE ASSEMBLY AND INSTALLATION STRUCTURE CAPABLE OF BOTH HANGING AND SUSPENDED APPLICATIONS

BACKGROUND OF THE INVENTION

1) Field of the Invention

The invention herein relates to a light fixture assembly and installation structure capable of both hanging and suspended applications in which a mounting block has extending from its lateral end a rectangular passage and a suspending rod has at its bottom end a rectangular insertion rod for fastening that matches the shape of the passage, thereby providing for the insertion and tight positioning of the suspending rod in the passage; the mounting block has situated at the inside of a switch box a platform, with a retainer hinged to an appropriate position at each of its two sides; and installed to the top surfaces of the retainers is a positioning spring and, furthermore, the positioning spring is normally in a compressed state, the said structural features providing for the insertion and tight positioning of the suspending rod in the passage of the switch box without fastening additional bolts and using the associated tools such that the invention herein effectively achieves assembly and installation simplicity and convenience.

2) Description of the Prior Art

Conventional light fixture assembly and installation structures, whether utilized for wall-mounted lamp, table lamp, or floor lamp applications, all require the fastening of nuts and bolts; however, since such nuts and bolts assembly and installation structures involve intricate procedures, the finished products are easily damaged during completion and, furthermore, since fastening tools (such as wrenches and screw drivers, etc.) are also required during assembly, the construction complexity often results in troublesome assemblage; in view of the said shortcomings, the inventor of the invention herein conducted research which culminated in the successful development of the invention herein.

SUMMARY OF THE INVENTION

The primary objective of the invention herein is to provide a light fixture assembly and installation structure capable of both hanging and suspended applications, wherein a mounting block has extending from its lateral end a rectangular passage and a suspending rod has at its bottom end a rectangular insertion rod for fastening that matches the shape of the passage, thereby providing for the insertion and tight positioning of the suspending rod in the passage; the mounting block has situated at the inside of a switch box a platform, with a retainer hinged to each of its two sides and, furthermore, the free ends of the retainers normally project into the passage; installed to the top surfaces of the retainers is a positioning spring fastened by means of a bolt and, furthermore, the positioning spring is normally in a compressed state; as such, when the suspending rod is inserted into the passage, the suspending rod pushes outward at an appropriate degree against the retainers, pulling the positioning spring installed at the upper extent of the retainers such that the retraction of the spring causes the retainers to move inward and clamp the suspending rod and thereby tightly position the suspending rod onto the switch box; as such, since the suspending rod is inserted and tightly positioned in the passage of the switch box without fastening additional bolts and using the associated tools, the invention herein effectively achieves assembly and installation simplicity and convenience.

BRIEF DESCRIPTION OF THE DRAWINGS

FIG. 3-B is a cross-sectional drawing of the invention herein while the insertion rod is being installed.

FIG. 3-C is a cross-sectional drawing of the invention herein after the insertion rod is installed.

FIG. 4-A is a magnified drawing of the conjoinment position.

FIG. 5 is an orthographic drawing of the invention herein as assembled in a suspended lamp application arrangement.

FIG. 5-A is a magnified drawing of the conjoinment position.

FIG. 6 is an orthographic drawing of the invention herein assembled in a wall-mounted lamp application arrangement.

FIG. 6-A is a magnified drawing of the conjoinment position.

DETAILED DESCRIPTION OF THE INVENTION

Figure 1:
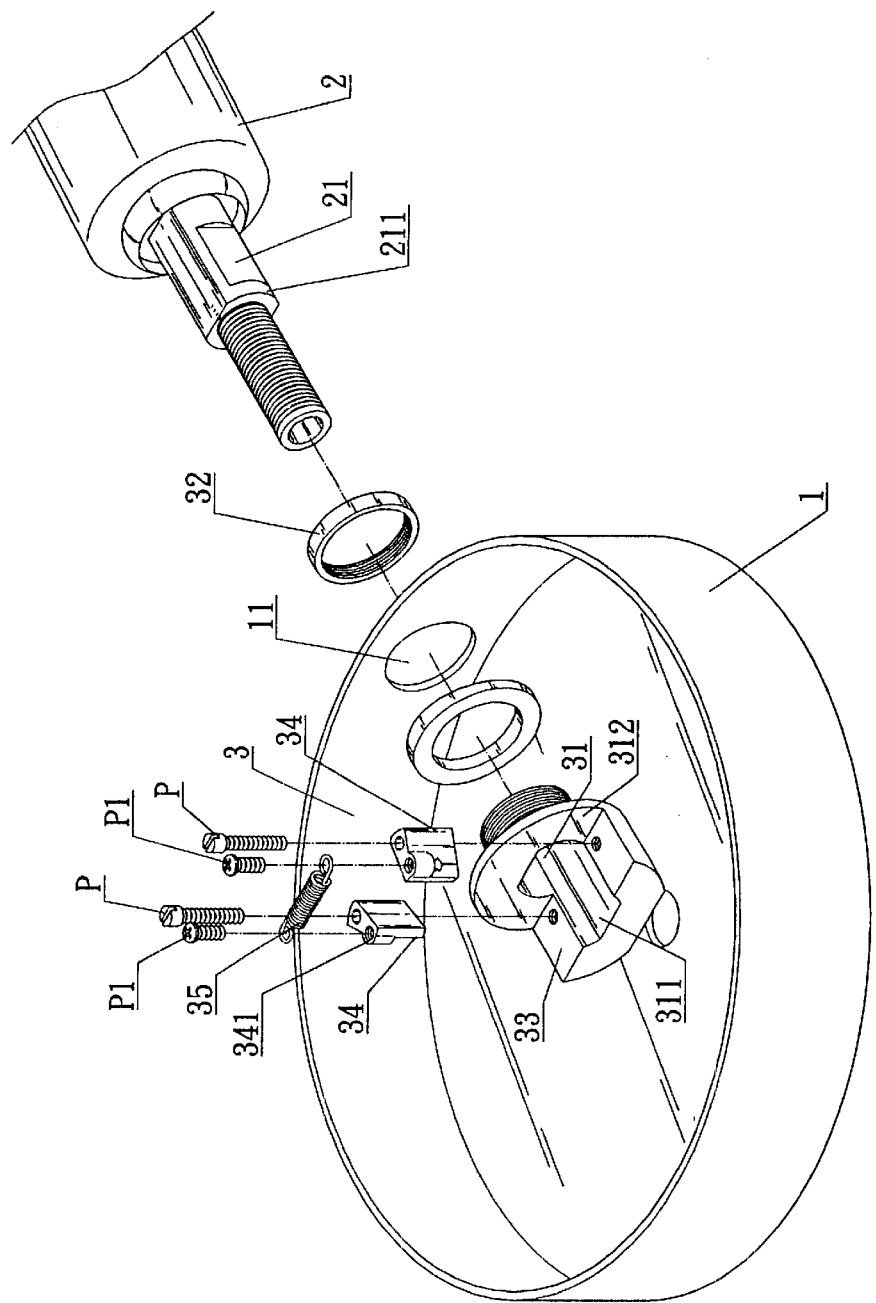
FIG. 1 is an exploded drawing of the invention herein.
Figure 2:
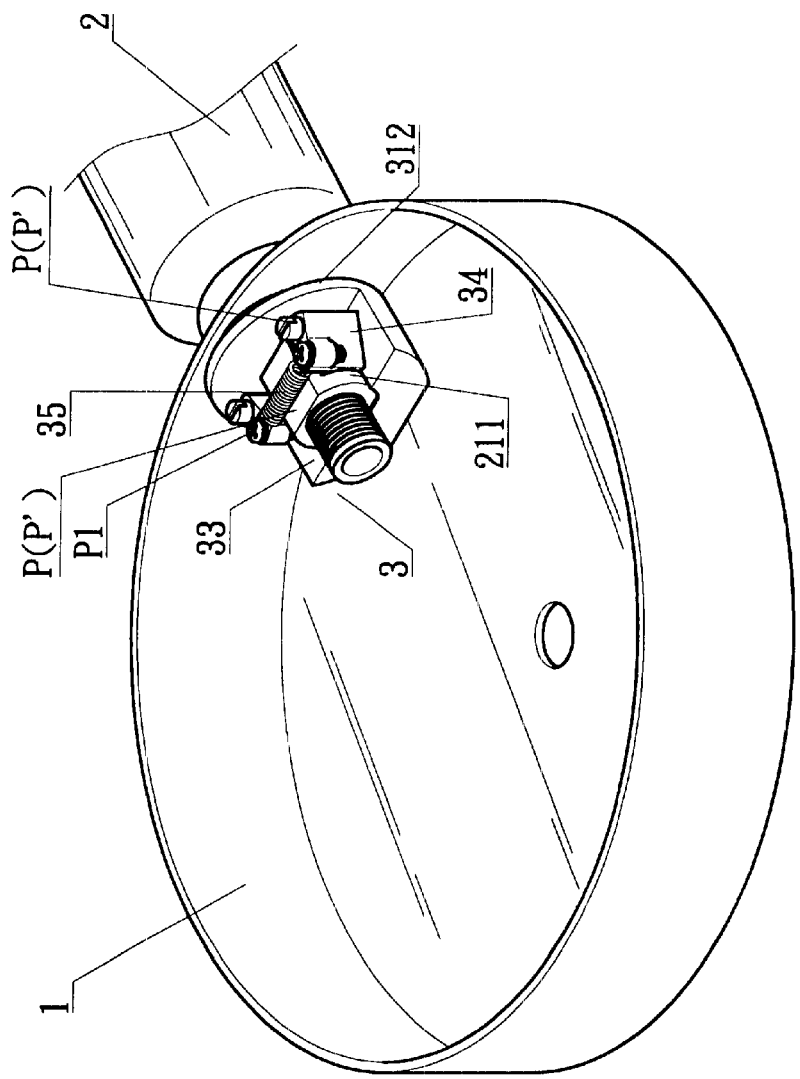
FIG. 2 is an exploded drawing of the invention herein.

Referring to FIG. 1 and FIG. 2, the structural arrangement of the present invention, the invention herein is comprised of a switch box 1 and a suspending rod 2 tightly fastened onto the switch box 1, in which:

The said switch box 1 has formed in its circumferential edge an opening 11 and, furthermore, fitted within the opening 11 is a mounting block 3, the lateral end of the said mounting block 3 extending through the opening 11 and, furthermore, disposed through the inner circumference is a rectangular passage 31, with the passage 31 penetrating the position of the switch box 1, and fastened at the outer circumference is a fixing ring 32 that positions the mounting block 3 inside the switch box 1; the mounting block 3 has profiled at its other lateral end inside the switch box 1 a platform 33 and, furthermore, formed along the top surface of the platform 33 is a channel 311 that is contiguous with the passage 31; the platform 33 has disposed at each of its two sides a retainer 34 fastened by means of a bolt P and, furthermore, the free ends 341 of the retainers 34 normally project into the passage 31; since the retainer 34 fastening sections P' are situated against a side wall 312 of the mounting block 3, the retainers 34 are only capable of being pushed outward in a single direction on the support points of the fastening sections P and cannot be pivoted inward; and a positioning spring 35 is installed onto the two retainers 34 to connect them at their top surface free ends 341 by means of a bolt P1 and, furthermore, the positioning spring 35 is normally in a compressed state.

The said suspending rod 2 has at its conjoinment area that is aligned with and secured to the switch box 1 a rectangular insertion rod 21 and, furthermore, slightly protruding from the two sides of the insertion rod 21 is a bottoming end 211 such that the outward pushing of the free ends 341 of the retainers 34 causes the suspending rod 2 to be tightly positioned onto the switch box 1.

Figure 3:
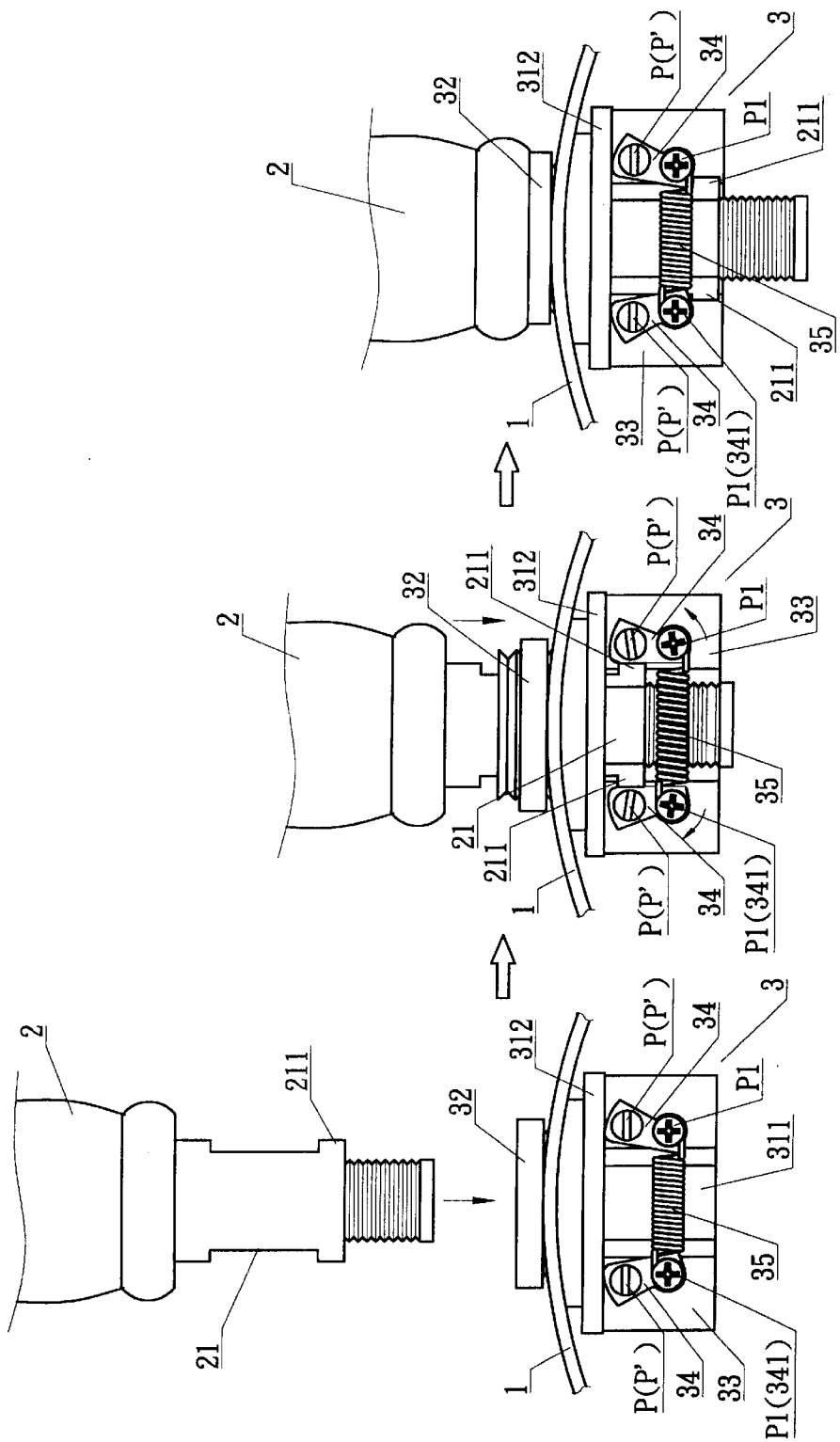
FIG. 3-A is a cross-sectional drawing of the invention herein under normal conditions.

Regarding their function, as indicated in FIG. 3, under normal conditions, the said switch box 1 retainers 34 project slightly inside the passage 31, with the positioning spring 35 installed on the top surfaces of the retainers 34 in a compressed state (as shown in FIG. 3-A).

When the suspending rod 2 is inserted into the passage 31, the bottoming end 211 of the suspending rod 2 pushes outward against the free ends 341 of the retainers 34, pulling the positioning spring 35 installed at the upper aspect of the free ends 341 to provide for the insertion of the suspending rod 2 into the passage 31 (as indicated in FIG. 3-B).

After the suspending rod 2 is inserted, the bottoming end 211 of the insertion rod 21 passes beyond the positioning spring 35 and the retainers 34, following which the positioning spring 35 returns to its original state and the retainers 34 move inward and clamp the suspending rod 2, and since fastening sections P' are against the side wall 312 of the mounting block 3, the structural feature of the retainers 34 is that they are only capable of being pushed outward in a single direction on the support points of the fastening sections P' such that the suspending rod 2 is engaged by the retainers 34 and cannot be withdrawn, thereby tightly positioning the suspending rod 2 onto the switch box 1 (as shown in FIG. 3-C).

Figure 4:
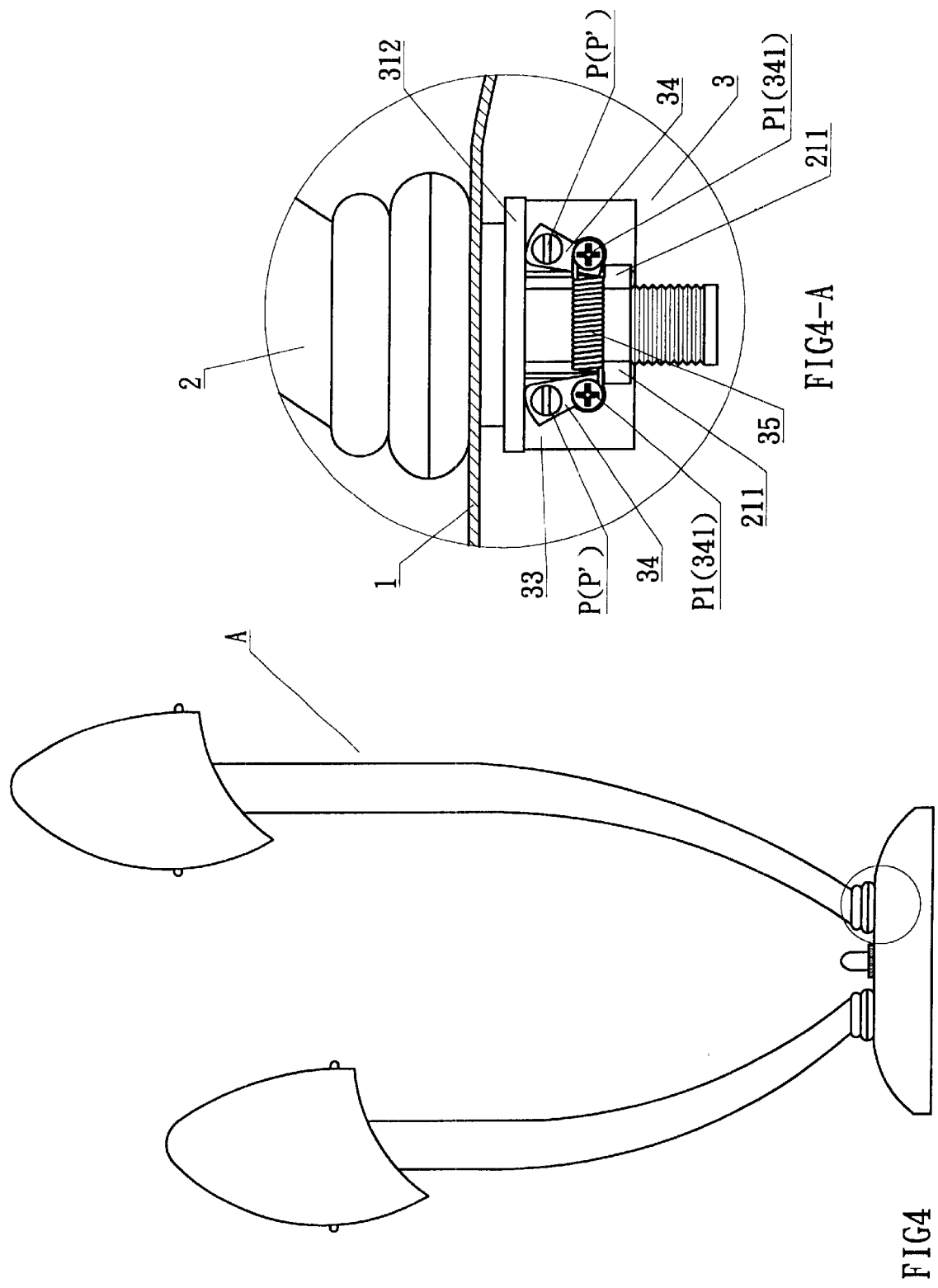
FIG. 4 is an orthographic drawing of the invention herein as assembled in a table lamp application arrangement.

Referring to FIG. 4, FIG. 5, and FIG. 6, the drawings of the various lamp embodiments of the invention herein, wherein FIG. 4 is a reference drawing of the invention herein as assembled in a table lamp A application arrangement; FIG. 5 is a reference drawing of the invention herein as assembled in a suspended lamp B application arrangement; and FIG. 6 is a reference drawing of the invention herein as assembled in a wall-mounted lamp c application arrangement.

What is claimed is:

1. A light fixture assembly and installation structure capable of both hanging and suspended applications comprised of a switch box having formed in its circumferential edge an opening and a suspending rod tightly fastened onto the said switch box, in which:

The said switch box has fitted within the said opening a mounting block, the lateral end of the said mounting block extending through the said opening and, furthermore, disposed through the inner circumference is a rectangular passage, with the said passage penetrating the position of the said switch box, and fastened at the outer circumference is a fixing ring that positions the said mounting block inside the said switch box; the said mounting block has profiled at its other lateral end inside the said switch box a platform and, furthermore, formed along the top surface of the said platform is a channel that is contiguous with the said passage; the said platform has disposed at each of its two sides a retainer fastened by means of a bolt and, furthermore, the free ends of the said retainers normally project into the said passage; since the said retainer fastening sections are situated against a side wall of the said mounting block, the said retainers are only capable of being pushed outward in a single direction on the support points of the said fastening sections and cannot be pivoted inward; furthermore, a positioning spring is installed onto the two said retainers to connect them at their said free ends on the top surface by means of a bolt and, furthermore, the said positioning spring is normally in a compressed state;

the said suspending rod has at its conjoinment area that is aligned with and secured to the said switch box a rectangular insertion rod and, furthermore, slightly protruding from the two sides of the said insertion rod is a bottoming end that pushes outward against the said retainers; when the said suspending rod is inserted into the said passage, the said positioning spring installed at the upper extent of the said free ends is pulled an appropriate degree; and after the said suspending rod is inserted, the structural feature of the retainers is that they cannot be withdrawn once engaged, thereby tightly positioning the said suspending rod onto the said switch box and effectively achieving assembly and installation simplicity and convenience.

2. As mentioned in claim 1 of the light fixture assembly and installation structure capable of both hanging and suspended applications of the invention herein, the said passage of the said mounting block secured in the said switch box opening penetrates the position of the said switch box and fastened at its outer circumference is a fixing ring that positions the said mounting block inside the said switch box.

3. As mentioned in claim 1 of the light fixture assembly and installation structure capable of both hanging and suspended applications of the invention herein, the said passage of the said switch box can be of a triangular, rectangular, pentagonal, or other polygonal shape.

* * * * *